(12) United States Patent
Akahane et al.

(10) Patent No.: US 8,029,044 B2
(45) Date of Patent: Oct. 4, 2011

(54) CAB STRUCTURE OF CONSTRUCTION EQUIPMENT

(75) Inventors: Eiji Akahane, Tokyo (JP); Takayuki Yuasa, Tokyo (JP); Kazushige Tasaki, Tokyo (JP); Masayoshi Nakajima, Tokyo (JP); Robert D. Clausen, Tokyo (JP); Teruyuki Yamada, Hyogo (JP); Hideo Kosaka, Kanagawa (JP); Yusuke Harayama, Kanagawa (JP)

(73) Assignees: Caterpillar Japan Ltd., Tokyo (JP); Press Kogyo Co., Ltd., Kawasaki-shi, Kanagawa (JP)

(*) Notice: Subject to any disclaimer, the term of this patent is extended or adjusted under 35 U.S.C. 154(b) by 64 days.

(21) Appl. No.: 12/449,623

(22) PCT Filed: Jan. 31, 2008

(86) PCT No.: PCT/JP2008/051510
§ 371 (c)(1),
(2), (4) Date: Aug. 18, 2009

(87) PCT Pub. No.: WO2008/102625
PCT Pub. Date: Aug. 28, 2008

(65) Prior Publication Data
US 2010/0117399 A1 May 13, 2010

(30) Foreign Application Priority Data

Feb. 19, 2007 (JP) .................................. 2007-037486

(51) Int. Cl.
*B60N 99/00* (2006.01)

(52) U.S. Cl. .............................. 296/190.11; 296/190.08
(58) Field of Classification Search ............. 296/190.08, 296/190.11, 205, 29
See application file for complete search history.

(56) References Cited

U.S. PATENT DOCUMENTS

| 6,076,725 A | 6/2000 | Imamura et al. |
| 2008/0203768 A1 | 8/2008 | Lowe |

FOREIGN PATENT DOCUMENTS

| EP | 0 685 381 A1 | 12/1995 |
| FR | 2 753 676 | 3/1998 |
| FR | 2 831 511 | 5/2003 |
| GB | 1 541 631 | 3/1979 |
| GB | 2 446 928 A | 8/2008 |
| JP | 9-323170 | 12/1997 |
| JP | 2001-140283 | 5/2001 |
| JP | 2002-250052 | 9/2002 |
| JP | 2005-335474 | 12/2005 |
| JP | 2006-321373 | 11/2006 |

OTHER PUBLICATIONS

European Office Action dated Jan. 4, 2010.

*Primary Examiner* — Lori Lyjak
(74) *Attorney, Agent, or Firm* — McGinn IP Law Group PLLC

(57) ABSTRACT

To facilitate the production of a cab in the form of a box by joining side, rear and roof panels to pillars, and to improve the productivity. Pillars forming the cab (2) include composite pillars (16, 18) obtained by juxtaposing and joining together the pairs of pillar members (20, 22), and panel assemblies (4, 6, 8) adjacent to the pillar members (20, 22) are joined to the pillar members (20, 22) of the composite pillars (16, 18).

16 Claims, 2 Drawing Sheets

CAB STRUCTURE OF CONSTRUCTION EQUIPMENT

TECHNICAL FIELD

This invention relates to a cab structure of construction equipment and, more specifically, to a cab structure which enables the production to be facilitated and the productivity to be improved.

BACKGROUND ART

Cabs of construction equipment have been structured in the form of nearly like rectangular boxes by joining steel members together by welding. For example, a representative example of a cab of a hydraulic excavator which is a typical construction equipment is realized in the shape of a box by, first, sub-assembling various portions for forming the cab, erecting the right and left sub-assembled side panels, and joining rear and roof panels between them (e.g., see patent document 1).

When it is required to impart strength to the cab to cope with such cases as when the equipment might turned over or when a material might fall down thereon, steel pipe pillars are stud in the cab, and the side, rear and roof panels are joined to the pillars to complete the cab (e.g., see patent document 2).

Patent document 1: JP-A-2001-140283 (FIG. 5)
Patent document 2: JP-A-2005-335474 (FIG. 7)

DISCLOSURE OF THE INVENTION

Problems that the Invention is to Solve:

The cab structures of the above-mentioned conventional construction equipment have problems that must be solved as described below.

To facilitate the production of the cab and to improve the productivity, it is desired that various portions such as side, rear and roof panels are sub-assembled in a favorable welding operation attitude and welding operation environment, and the sub-assembled portions are joined and assembled as the cab.

In disposing the pillars in the cab, however, if the pillars are disposed at the rear right and rear left of the cab, the rear panel is joined, together with the right and left side panels, to the right and left pillars. Therefore, if the rear pillars are assembled being included in the sub-assembly of the rear panel, then there is no pillar to which the right and left side panel sub-assemblies are to be joined.

Particularly, in case many members are to be directly joined to the pillars and if there is no pillar at the time of sub-assembling the side panels, then the members must be welded to the pillars at the time of assembling the whole cab in the form of a box, which is detrimental to the welding operation attitude and welding operation environment, hindering the production and greatly decreasing the productivity.

The present invention was accomplished in view of the above fact, and its technical assignment is to provide a cab structure of construction equipment which enables the cab to be easily produced in the form of a box by joining side, rear and roof panels to the pillars, and the productivity to be improved.

Means for Solving the Problems:

In order to solve the above technical problems, the present invention provides a cab structure of construction equipment, comprising pillars to which are joined panels for forming the cab, wherein the pillars include composite pillars obtained by juxtaposing and joining pairs of pillar members together, and panels adjacent to the pillar members are joined to the pillar members of the composite pillars.

Desirably, the composite pillars are rear pillars stud on the rear right and rear left of the cab. Further, the pairs of pillar members of the composite pillars comprise pipes of a rectangular shape in cross section. The pairs of pipes of the rectangular shape in cross section have the same sectional area. Moreover, the composite pillars are provided with cover members for covering the outer surface side of the cab.

EFFECTS OF THE INVENTION

The cab structure of construction equipment constituted according to the present invention comprises pillars to which are joined panels for forming the cab, wherein the pillars include composite pillars obtained by juxtaposing and joining pairs of pillar members together, and panels adjacent to the pillar members are joined to the pillar members of the composite pillars.

Therefore, the pillar members on one side of the composite pillars are included in a sub-assembly of a panel adjacent thereto, e.g., of the rear panel, the pillar members on the other side are included in sub-assemblies of panels adjacent thereto, e.g., of the side panels, and the sub-assemblies are assembled in a favorable welding operation attitude and welding operation environment . To assemble the whole cab in the form of a box, therefore, pairs of pillar members may be simply joined together enabling the cab to be easily produced and the productivity to be improved.

BEST MODE FOR CARRYING OUT THE INVENTION

The cab structure of construction equipment constituted according to the present invention will be described below in further detail with reference to the accompanying drawings showing a preferred embodiment of a cab of a hydraulic excavator which is a representative construction equipment.

Figure 1:
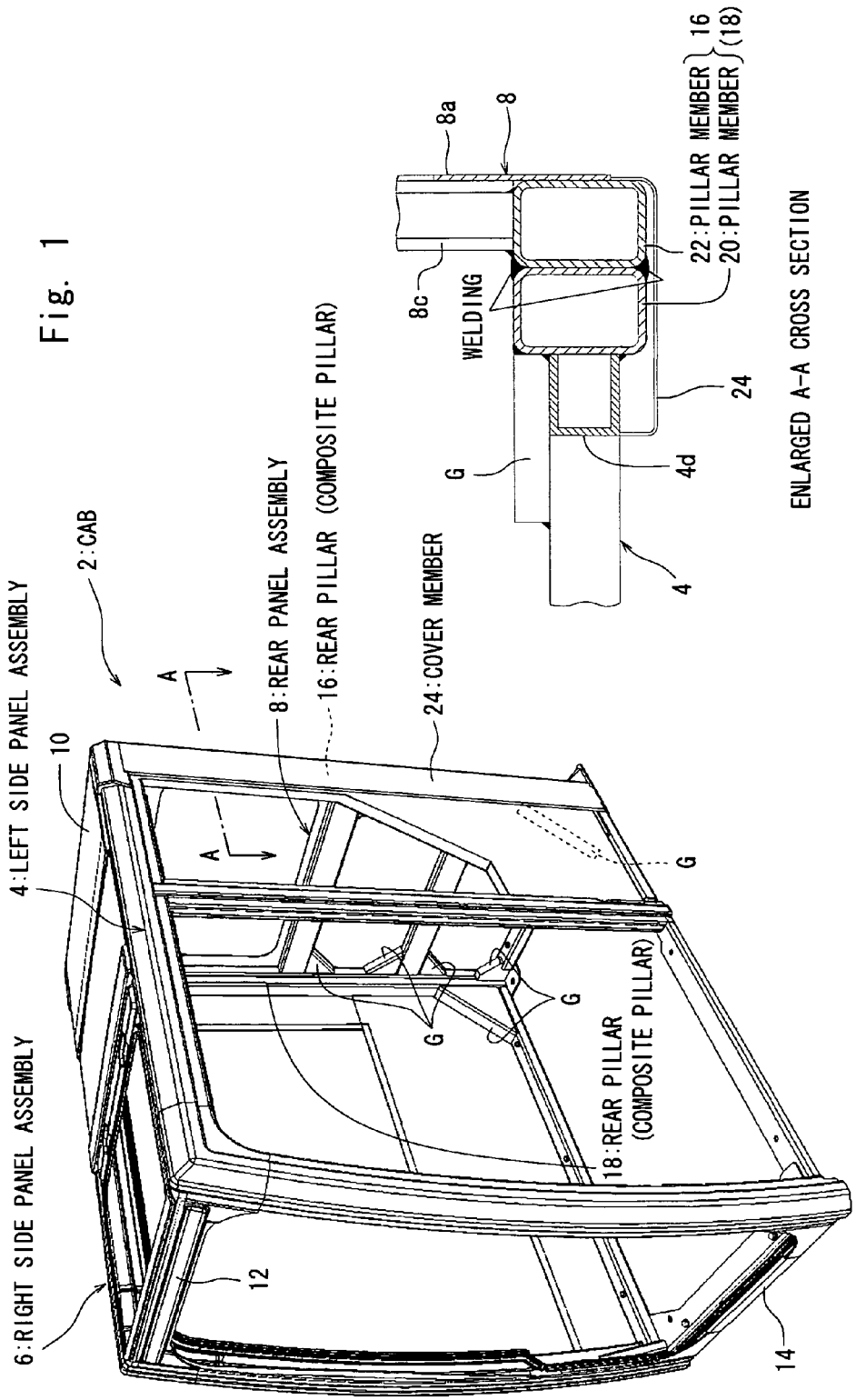
[FIG. 1] is a perspective view showing, in an assembled state, a cab structure of construction equipment constituted according to the present invention.
Figure 2:
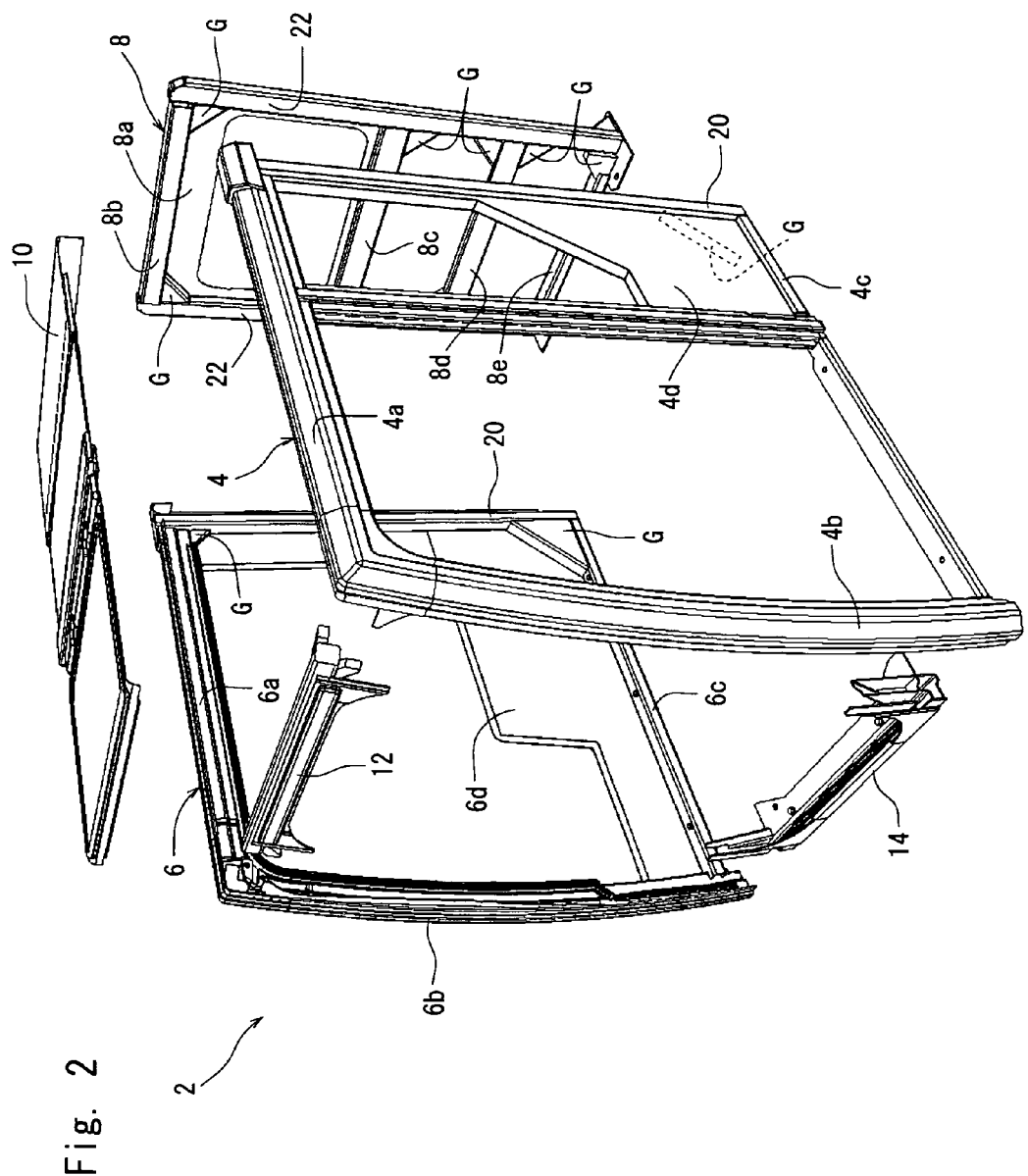
[FIG. 2] is a perspective view showing the cab of FIG. 1 in a state before various portions are assembled and joined together.

Reference is made to FIG. 1 and FIG. 2. FIG. 2 shows a state where a plurality of sub-assembles for forming the cab have not been joined together by welding or the like, and FIG. 1 shows a state where they are joined together like a box. The cab here is shown in the state of a skeletal structure of prior to incorporating sashes, glasses, doors or fittings.

The cab 2 generally designated at 2 includes a left side panel assembly 4, a right side panel assembly 6, a rear panel assembly 8, a roof panel assembly 10, a front upper part assembly 12 and a front lower part assembly 14, which are sub-assemblies formed by joining various steel members by welding. The bottom surface of the cab 2 is opened so that the cab 2 can be installed on the floor of a control seat of the body of the construction equipment.

At the rear right and rear left of the cab 2 (right side portions in FIG. 1 and FIG. 2), there are provided a left rear pillar 16 and a right rear pillar 18 which are erected between the left side panel assembly 4 and the rear panel assembly 8, and between the right side panel assembly 6 and the rear panel assembly 8, respectively.

The rear pillars 16 and 18 are substantially of the same shape, and are the composite pillars obtained by juxtaposing and integrally joining together the pairs of pillar members 20 and 22 which are formed by rectangular pipes. The one pillar member 20 is positioned on the side of the left side panel assembly 4 or the right side panel assembly 6 adjacent thereto, and the other pillar member 22 is positioned on the side of the rear panel assembly 8 adjacent thereto. The pair of rectangular pipes has the same sectional area.

To the pillar member 20 of the one rear pillar 16, there is joined the left side panel assembly 4 adjacent thereto. To the pillar member 20 of the other rear pillar 18, there is joined the right side panel assembly 6 adjacent thereto. To the pillar members 22 of the rear pillars 16 and 18, there is joined the rear panel assembly 8 adjacent thereto.

Therefore, the pillar member 20 of the rear pillar 16 is integrally joined to the left side panel assembly 4, the pillar member 20 of the rear pillar 18 is integrally joined to the right side panel assembly 6, and the pillar members 22 of the rear pillars 16 and 18 are integrally joined to the rear panel assembly 8.

The pairs of pillar members 20 and 22 are welded together at the step of completing the cab 2 in form of a box by joining the assemblies together (the welding will be described later in detail).

The rear panel assembly 8 includes a panel 8a to be joined to the right and left pillar members 22 and 22, a plurality of beam members 8c, 8d and 8e crossing between the right and left pillar members 22 and 22 and are to be joined thereto, and a plurality of reinforcing gussets G to be joined to the portions where the beam members come in contact with the pillar members 22.

The left side panel assembly 4 includes an upper beam 4a, a front pillar 4b and a lower beam 4c for forming a frame body together with the pillar member 20, a panel 4d joined to the pillar member 20, to the upper beam 4a and to the lower beam 4c, and a plurality of reinforcing gussets G joined to the portions where the lower beam 4d comes in contact with the pillar members 20.

The right side panel assembly 6 includes an upper beam 6a, a front pillar 6b and a lower beam 6c for forming a frame body together with the pillar member 20, a panel 6d joined to the pillar member 20, to the upper beam 6a and to the lower beam 6c, and a plurality of reinforcing gussets G joined to the portions where the upper beam 6a and lower beam 6d come in contact with the pillar members 20.

The roof panel assembly 10, front upper part assembly 12 and front lower part assembly 14 have no direct relationship to the rear pillars 16 and 18 which are the composite pillars, and are not described here in detail.

A plurality of assemblies such as rear panel assembly 8, etc. are joined integrally together by welding to assemble the cab 2 in the form of a box as shown in FIG. 1. Here, the pairs of pillar members 20 and 22 forming the rear pillars 16 and 18 are integrally joined together by welding along the bevelings formed at both ends of the abut portions (see enlarged sectional view of FIG. 1).

Cover members 24 extending over the overall length of the rear pillars 16 and 18 are made from a plate member having a channel shape in cross section, and are joined to the left side panel assembly 4 and to the rear panel assembly 8, and to the right side panel assembly 6 and to the rear panel assembly 8 so as to cover the pairs of pillar members 20 and 22 of the composite rear pillars 16 and 18 on the outer surface side of the cab 2.

Described below are the actions and effects of the above-mentioned cab structure of construction equipment.

The pillars to which are joined the panels for forming the cab 2 are the composite rear pillars 16 and 18 obtained by juxtaposing and integrally joining pairs of pillar members 20 and 22, and to the pillar members 20 and 22 of the composite pillars 16 and 18 are joined the panels adjacent thereto.

That is, the pillar members 22 on one side of the composite pillars 16 and 18 are included in the rear panel assembly 8 which is a sub-assembly of the rear panel adjacent thereto, and the pillar members 20 on the other side are included in the left side panel assembly 4 and in the right side panel assembly 6 which are sub-assemblies of the side panels adjacent thereto. These sub-assemblies are assembled in a favorable welding operation attitude and welding operation environment, and the pairs of pillar members 20 and 22 are joined together to realize composite pillars at the time of assembling the whole cab 2 in the form of a box. Therefore, many reinforcing members do not have to be welded to the pillars at the time of assembling the whole cab in the form of a box making it easy to produce the cab 2 and to improve the productivity.

Further, the rear pillars 16 and 18 which are the composite pillars are reinforced twice as much as the single pillars (i.e., in a manner that the interiors of the single pillars are reinforced) and, therefore, the rigidity of the cabin 2 can be improved. If the same strength as that of the single pillar may suffice, then the composite pillars may be finely formed.

Since the composite pillars are stud as the rear pillars 16 and 18 at the rear right and rear left of the cab 2, the operator of the construction equipment positioned at the rear part of the cab 2 can be effectively protected. That is, the rear pillars 16 and 18 have a strength by themselves and, besides, many reinforcing members are easily joined to the rear pillars 16 and 18.

The pairs of pillar members 20 and 22 forming the composite pillars 16 and 18 comprise pipes of a rectangular shape in cross section, and can be easily joined to each other or to the members adjacent thereto, enabling the cab to be easily produced.

The pairs of pipes of a rectangular shape in cross section which are the pillar members 20 and 22, have substantially the same sectional area, facilitating the availability and inventory, and enabling the cab to be more easily produced.

Further, since the rear pillars 16 and 18 which are the composite pillars are provided with covering members 24 for covering the outer surface side of the cab, qualities in appearance and impression of the cab 2 can be improved.

Though the invention was described above in detail by way of an embodiment, it should be noted that the invention is in no way limited to the above embodiment only but can be, further, varied or modified in a variety of ways in a manner, for example, as described below without departing from the scope of the invention.

In the embodiment of the invention, the composite pillars obtained by juxtaposing and integrally joining the pairs of pillar members are applied as the rear pillars 16 and 18 at the rear part of the cab, but can also be applied as any other pillars such as front pillars of the cab.

In the embodiment of the invention, the pairs of pillar members 20 and 22 forming the composite pillars 16 and 18 comprise rectangular pipes, but may comprise any other polygonal pipes or circular pipes instead.

In the embodiment of the invention, the pairs of pillar members 20 and 22 forming the composite pillars 16 and 18 comprise rectangular having the same sectional area but may, further, comprise rectangular pipes but having different sizes.

The invention claimed is:

1. A cab structure of construction equipment, said cab structure comprising:

pillars to which are joined panels for forming sub-assemblies of the cab structure,
wherein said pillars include composite pillars obtained by juxtaposing and joining pairs of pillar members of the sub-assemblies together,
wherein panels adjacent to the pillar members are joined to the pillar members of the sub-assemblies,
wherein the composite pillars comprise a rear left pillar and a rear right pillar,
wherein the sub-assemblies comprise a rear panel assembly, a left side panel assembly, and a right side panel assembly, and
wherein each of said pillars comprises a rectangular pipe, and joining faces of the pillars are oriented in a back-and-forth direction of the cab structure.

2. The cab structure of construction equipment according to claim 1, wherein the composite pillars comprise rear pillars stud on a rear right and a rear left of the cab structure.

3. The cab structure of construction equipment according to claim 1, wherein pairs of the pillar members of the sub-assemblies comprise pipes of a rectangular shape in a cross section.

4. The cab structure of construction equipment according to claim 3, wherein pairs of rectangular pipes have the same sectional area.

5. The cab structure of construction equipment according to claim 1, wherein the composite pillars are provided with cover members for covering an outer surface side of the cab structure.

6. The cab structure of construction equipment according to claim 2, wherein pairs of the pillar members of the sub-assemblies comprise pipes of a rectangular shape in a cross section.

7. The cab structure of construction equipment according to claim 2, wherein the composite pillars are provided with cover members for covering an outer surface side of the cab structure.

8. The cab structure of construction equipment according to claim 3, wherein the composite pillars are provided with cover members for covering an outer surface side of the cab structure.

9. The cab structure of construction equipment according to claim 4, wherein the composite pillars are provided with cover members for covering an outer surface side of the cab structure.

10. The cab structure of construction equipment according to claim 1, wherein the sub-assemblies are assembled in a predetermined welding operation attitude.

11. The cab structure of construction equipment according to claim 1, wherein pairs of pillar members are joined together to form the composite pillars at a time of assembling an entirety of the cab structure in a form of a box.

12. The cab structure of construction equipment according to claim 1, wherein the pillars comprise sliding pillars for accommodating a sliding roof window that slides back and forth between the left side panel assembly and the right side panel assembly.

13. The cab structure of construction equipment according to claim 1, wherein the rear left pillar and the rear right pillar are erected between the left side panel assembly and the rear panel assembly, and between the right side panel assembly and the rear panel assembly, respectively.

14. The cab structure of construction equipment according to claim 1, wherein the rear left pillar is integrally joined to the left side panel assembly, and the rear right pillar is integrally joined to the right side panel assembly.

15. The cab structure of construction equipment according to claim 1, wherein joining faces of the pillar members causes adjusting dimensions between the left side panel assembly and the right side panel assembly by sliding the pillars toward each other.

16. The cab structure of construction equipment according to claim 15, wherein the dimensions between the left side panel assembly and the right side panel assembly causes sliding a roof window back and forth between the left side panel assembly and the right side panel assembly.

\* \* \* \* \*